US009348437B2

(12) United States Patent
Zampini et al.

(10) Patent No.: US 9,348,437 B2
(45) Date of Patent: May 24, 2016

(54) MOBILE DATA COLLECTION AND VALIDATION SYSTEMS AND METHODS

(75) Inventors: Francesco Zampini, Rome (IT); Gabriele Mutarelli, Milan (IT); Giovanni D'Angelo, Rome (IT); Marco Donna, Turin (IT); Andrea Franco, Rome (IT)

(73) Assignee: Accenture Global Services Limited, Dublin (IE)

( * ) Notice: Subject to any disclaimer, the term of this patent is extended or adjusted under 35 U.S.C. 154(b) by 633 days.

(21) Appl. No.: 12/025,408

(22) Filed: Feb. 4, 2008

(65) Prior Publication Data

US 2009/0089403 A1 Apr. 2, 2009

(30) Foreign Application Priority Data

Oct. 1, 2007 (EP) .................................... 07425608

(51) Int. Cl.
| | | |
|---|---|---|
| *G06F 15/16* | (2006.01) | |
| *G06F 3/0354* | (2013.01) | |
| *G06F 3/03* | (2006.01) | |
| *G06K 9/03* | (2006.01) | |
| *G06K 9/22* | (2006.01) | |
| *G06Q 10/10* | (2012.01) | |
| *H04L 9/32* | (2006.01) | |
| *G06F 21/62* | (2013.01) | |
| *H04L 29/06* | (2006.01) | |

(52) U.S. Cl.
CPC .......... *G06F 3/03545* (2013.01); *G06F 3/0317* (2013.01); *G06K 9/03* (2013.01); *G06K 9/222* (2013.01); *G06Q 10/10* (2013.01); *G06F 21/6209* (2013.01); *H04L 9/32* (2013.01); *H04L 63/06* (2013.01)

(58) Field of Classification Search
CPC ............ G06F 21/6209; G06F 3/03545; G06F 3/0317; H04L 63/06; H04L 9/32; G06K 9/03; G06K 9/222; G06Q 10/10
See application file for complete search history.

(56) References Cited

U.S. PATENT DOCUMENTS

| | | | | |
|---|---|---|---|---|
| 5,247,591 | A | * | 9/1993 | Baran ............................ 382/179 |
| 5,627,349 | A | * | 5/1997 | Shetye et al. .............. 178/18.01 |
| 5,943,137 | A | * | 8/1999 | Larson et al. ................. 358/403 |

(Continued)

FOREIGN PATENT DOCUMENTS

| | | |
|---|---|---|
| CN | 1667628 | 9/2005 |
| EP | 1 477 937 A2 | 11/2004 |

(Continued)

OTHER PUBLICATIONS

Furukawa, et al. "D-Pen: A Digital Pen System for Public and Business Enterprises", Frontiers in Handwriting Recognition, Ninth International Workshop on Tokyo, Oct. 2004.*

(Continued)

*Primary Examiner* — Arvin Eskandarnia
*Assistant Examiner* — Anthony Fabbri
(74) *Attorney, Agent, or Firm* — Fish & Richardson P.C.

(57) ABSTRACT

Methods and systems for collecting and validating data are provided. Data may be collected from users at a variety of locations with a mobile device. The mobile device may wirelessly transmit the collected data to a central location. The collected data may then be validated at the central location and any resulting error messages may be transmitted to the mobile device while the mobile device remains in close proximity to the user so that the data may be corrected.

34 Claims, 3 Drawing Sheets

(56) References Cited

U.S. PATENT DOCUMENTS

| | | |
|---|---|---|
| 6,430,602 B1* | 8/2002 | Kay et al. .................... 709/206 |
| 6,456,740 B1* | 9/2002 | Carini et al. ................. 382/187 |
| 6,826,551 B1* | 11/2004 | Clary et al. .................... 706/46 |
| 2002/0019828 A1* | 2/2002 | Mortl ........................... 707/200 |
| 2002/0052794 A1* | 5/2002 | Bhadra ........................... 705/22 |
| 2002/0107885 A1* | 8/2002 | Brooks et al. ............... 707/505 |
| 2002/0162031 A1* | 10/2002 | Levin et al. ................. 713/202 |
| 2005/0240959 A1* | 10/2005 | Kuhn et al. .................... 725/25 |
| 2006/0138223 A1* | 6/2006 | Schar ........................... 235/384 |
| 2006/0173792 A1* | 8/2006 | Glass ............................ 705/75 |
| 2007/0046653 A1* | 3/2007 | Halfpenny et al. ............ 345/179 |
| 2008/0181501 A1* | 7/2008 | Faraboschi et al. ........... 382/179 |
| 2008/0222271 A1* | 9/2008 | Spires ......................... 709/218 |
| 2008/0270571 A1* | 10/2008 | Walker et al. ................ 709/218 |
| 2010/0031020 A1* | 2/2010 | Goldstein ........... G06F 21/6245<br>713/153 |
| 2010/0217880 A1* | 8/2010 | Venezia ................ G06Q 10/10<br>709/229 |
| 2011/0035264 A1* | 2/2011 | Zaloom ................. G06Q 10/10<br>705/14.12 |
| 2011/0047237 A1* | 2/2011 | Walsh .................... G06Q 10/10<br>709/207 |
| 2011/0219084 A1* | 9/2011 | Borra ..................... G06F 15/16<br>709/206 |
| 2012/0047560 A1* | 2/2012 | Underwood ........... G06Q 10/06<br>726/4 |
| 2013/0159443 A1* | 6/2013 | Dellenbach ......... H04L 12/5815<br>709/206 |

FOREIGN PATENT DOCUMENTS

| | | |
|---|---|---|
| EP | 1 594 044 A2 | 11/2005 |
| WO | 2006010737 A2 | 2/2006 |

OTHER PUBLICATIONS

European Search Report from EP Application No. EP 07 42 5608 dated Apr. 23, 2008.

Examiner Imran Siddiqui, Examination Report for Canadian Application No. 2,639,866, dated Jul. 14, 2014, 2 pages.

* cited by examiner

MOBILE DATA COLLECTION AND VALIDATION SYSTEMS AND METHODS

FIELD OF THE INVENTION

This invention relates generally to the collection and processing of data received at mobile computer devices. More particularly, aspects of the invention provide methods and systems for collecting data at mobile computer devices and promptly validating the collected data.

DESCRIPTION OF RELATED ART

It is common to use mobile computer devices to collect data at remote locations. For example, package delivery companies often use digital pen devices for customers to complete forms and sign for packages when they are delivered to customer premises. The collected signatures and data is stored locally and then downloaded later to update other computer devices.

Companies with sales forces distributed on the country's territory, post offices, package delivery companies and other entities often utilize a large number of forms that are periodically modified. Updating multiple copies of forms stored on a large number of mobile computer devices consumes valuable time and resources. Moreover, as the number of mobile computer devices increases, it becomes more likely that some of the mobile computer devices will inadvertently use outdated forms. Validation procedures also become complex and require the use of mobile computer devices having extensive processing capabilities when large numbers of forms are being utilized.

Incomplete and/or erroneous data collected with or without the use of mobile computer devices can result in significant costs to companies that own a medium or big sales force or that own other entities that frequently collect data from customers at locations remote from an office, such as a customer premises. A return trip to the customer location may be required to obtain the correct data. Often the correct or complete data cannot be obtained. The failure to obtain complete and correct data may result in procedures that are not in compliance with relevant standards or regulations. For example, a package may be delivered to a person who is not authorized to sign for the package.

Therefore, there is a need in the art for systems and methods that facilitate accurate and complete data collection from customers in remote locations.

BRIEF SUMMARY OF THE INVENTION

Aspects of the invention overcome problems and limitations of the prior art by providing systems and methods that collect data from users, such as customers, using a digital pen data collection system and then wirelessly communicate with one or more computer devices that validate the data. After any errors are identified, one or more messages may be transmitted back to the digital pen data collection system. Validation and transmission of messages may be performed in real time so that the user remains in close proximity to the digital pen data collection system and can correct the errors. Promptly correcting errors can reduce processing costs and increase compliance.

In one embodiment of the invention, a digital pen capture device includes an electronic ink capture device and a mobile terminal. The electronic ink capture device and mobile terminal communicate via a Bluetooth connection. The mobile terminal may exchange short message service (SMS) messages with the validating computer device.

In another embodiment there is provided a computer program product comprising computer readable instructions, which when loaded and run in a computer system and/or computer network system, cause the computer system and/or the computer network system to perform a method as described.

Some embodiments of the invention may include or utilize computer-executable instructions for performing one or more of the disclosed methods. The computer-executable instructions may be stored on a computer-readable medium, such as a portable memory drive or optical disk.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
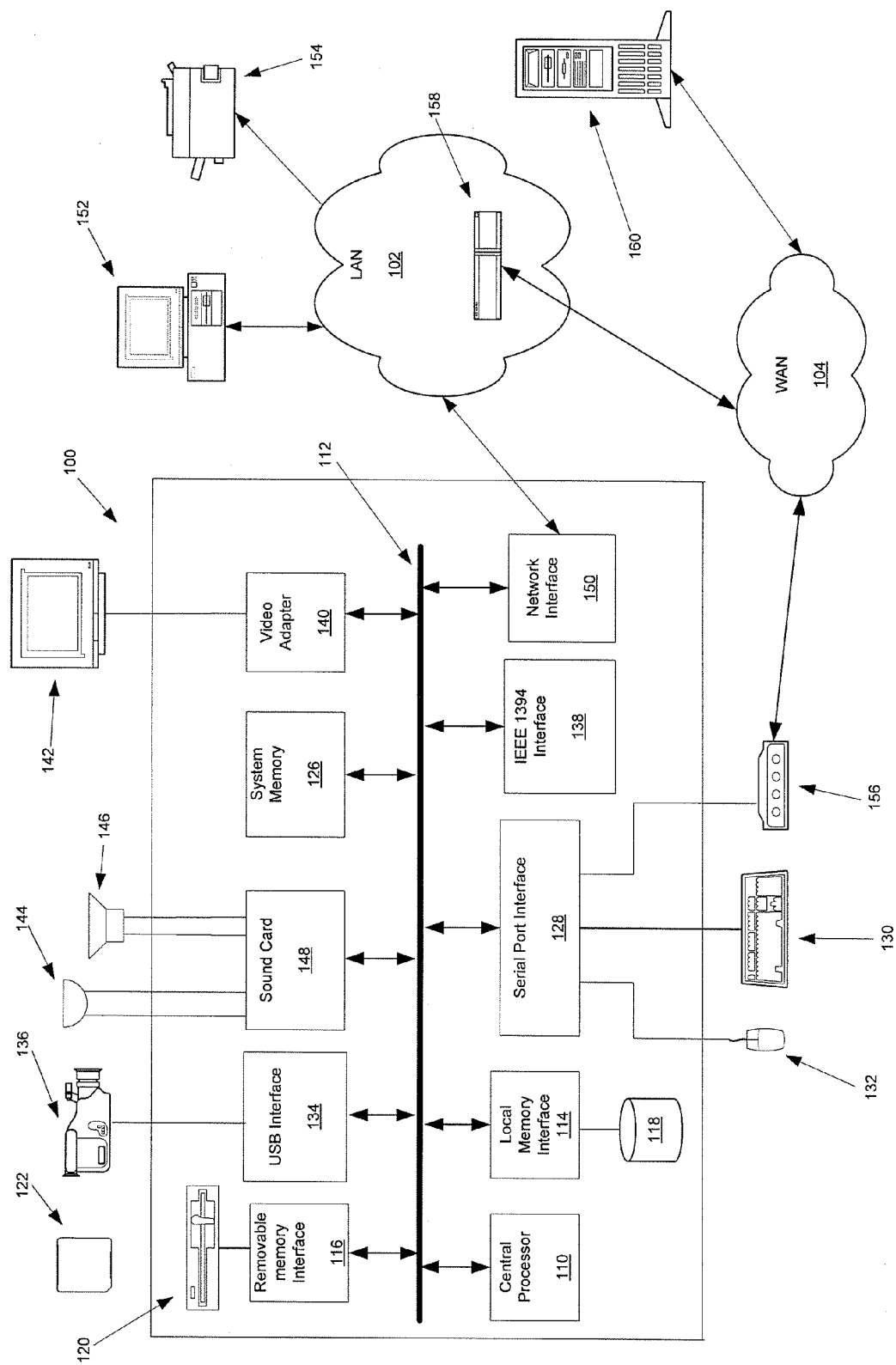
FIG. 1 shows a typical prior art workstation and communication connections.

Various embodiments of the present invention may be implemented with computer devices and systems that exchange and process data. Elements of an exemplary computer system are illustrated in FIG. 1, in which the computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hardwired or wireless mouse, track ball, pen device, or similar device.

Computer 100 may include additional interfaces for connecting peripheral devices to system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may be configured to operate with particular manufacture interfaces such as FireWire developed by Apple Computer and i.Link developed by Sony. Peripheral devices may include touch sensitive screens, game pads scanners, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as Ethernet. Computer 100 may communicate with other computers and devices connected to LAN 102, such as computer 152 and printer 154. Computers and other devices may be connected to LAN 102 via twisted pair wires, coaxial cable, fiber optics or other media. Alternatively, radio waves may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, personal digital assistants, telephones and other devices may also be connected to WAN 104.

The operation of computer 100 and server 160 can be controlled by computer-executable instructions stored on a computer-readable medium 122. For example, computer 100 may include computer-executable instructions for transmitting information to server 160, receiving information from server 160 and displaying the received information on display device 142. Furthermore, server 160 may include computer-executable instructions for transmitting hypertext markup language (HTML), extensible markup language (XML) or voice extensible markup language (VXML) computer code to computer 100.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 102, 104, but also a "content network," which is comprised of the data-attributable to a single entity-which resides across all physical networks.

Figure 2:
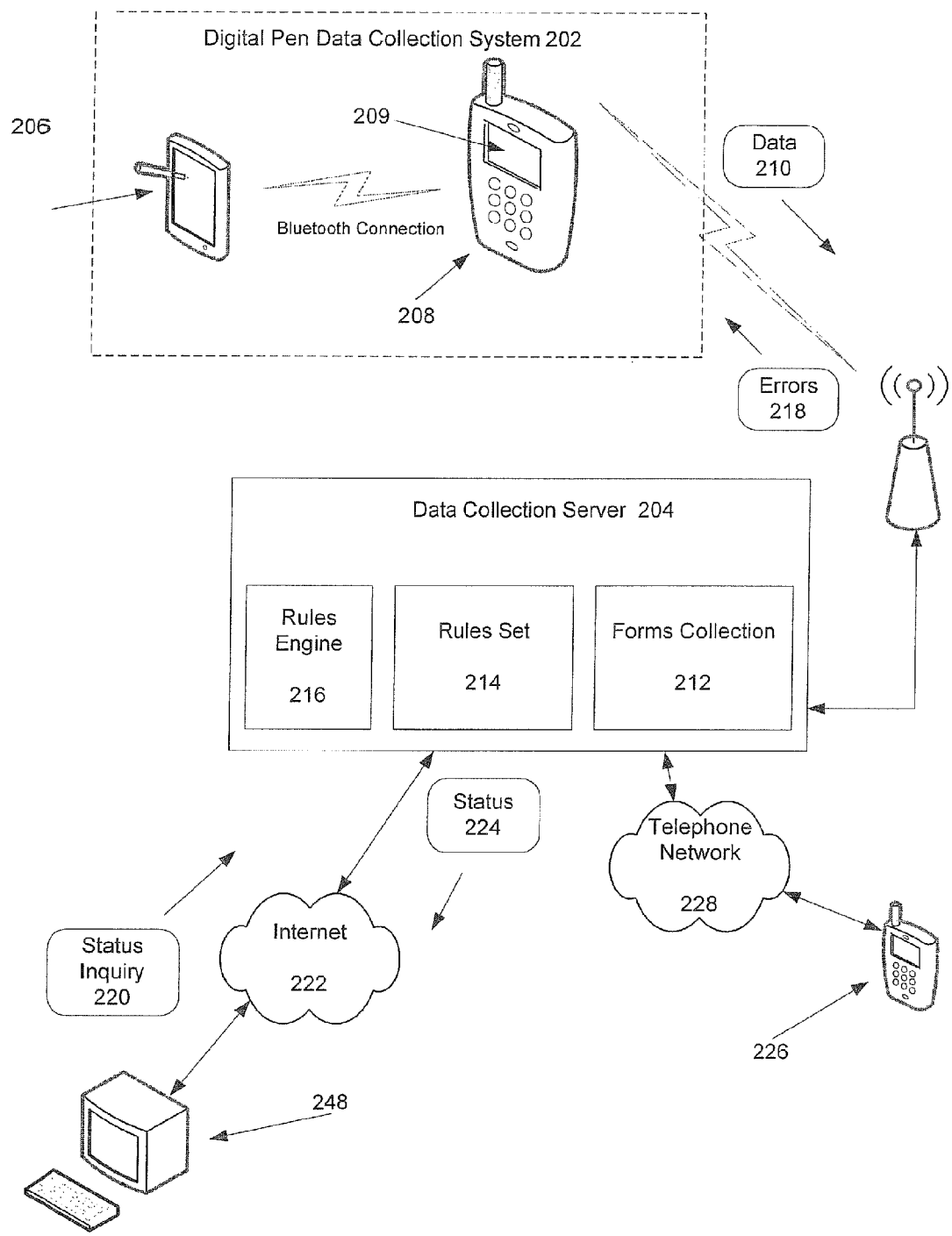
FIG. 2 illustrates a system that may be used to collect and validate data, in accordance with an embodiment of the invention.

FIG. 2 illustrates a system that may be used to collect and validate data, in accordance with an embodiment of the invention. A digital pen data collection system 202 may be used to collect data from users, such as customers, at locations remote from a data collection server 204. In one embodiment, digital pen data collection system 202 includes an electronic ink capture device 206 and a mobile terminal 208 with a mobile application that includes a graphical user interface 209 and that is configured to route data. Electronic ink capture device 206 may be implemented with a digital pen (a normal ink pen equipped with an electronic intelligence to allow it to digitally capture what it writes and transmit it back to mobile terminal 208) and a digital paper (a normal piece of paper with a specific pattern printed in the background used to allow the pen to orient itself on the paper) or other mechanism that allows a user to enter data with a stylus. Mobile terminal 208 may be implemented with a mobile telephone, mobile computer, or other mobile device capable of communicating with electronic ink capture device 206 and data collection server 204. Electronic ink capture device 206 and mobile terminal 208 may communicate with each other using a short-range radio connection, such as a Bluetooth connection. In alternative embodiments of the invention, digital pen data collection system 202 may be implemented with a single device, such as a Tablet PC, smart phone or other device capable of collecting data from a user and wirelessly communicating with data collection server 204. One embodiment of the invention includes the use of the digital pen together with a mobile terminal having installed a specific java application developed for the purpose. The mobile application may be a mobile application that redirects all the data received via Bluetooth from the electronic ink capture device 206 to the data collection server 204. The mobile application may get data via a Bluetooth device within mobile terminal 208 and store the data internally. After the data is stored, the mobile application opens an HTTP socket toward the server 204 and posts the data. The mobile application may include a set of additional features to let the user see what he has sent and what was not sent correctly (due for example to network unavailability) and allow the user to resend it.

Data 210 collected at digital pen collection system 202 may be wirelessly transmitted to data collection server 204. One skilled in the art will appreciate that wirelessly transmitting data may include transmitting a short message service (SMS) message or other type of data message via a mobile telephone network or other type of network. Moreover, a wireless transmission originating at mobile terminal 208 may be converted to be communicated over a wired network or connection before reaching data collection server 204. Wireless transmissions allow digital pen collection system to travel within a wireless network and communicate with data collection server 204, which may be stationary.

Data collection server 204 may be implemented with a computer device having one or more processors and memory modules. Data collection server 204 may also be implemented with a collection of connected servers. A forms collection 212 may be implemented with a database or other collection of forms. Forms collection 212 may provide forms to digital pen collection system 202 upon request. A rules set 214 may contain a list of rules used to validate data collected with digital pen collection system 202. For example, digital pen collection system 202 may transmit data relating to the delivery of a package to data collection server 204. A rules engine 216 may use rules set 214 to validate the data. Rules may relate to signature requirements, delivery locations, types of deliveries, etc.

After validating data, data collection server 204 may transmit one or more error messages 218 to digital pen collection system 202. Error messages may be in the form of short message service (SMS) messages. Error messages may include text identifying the error, such as "Signature must be from someone over 18 years old." In other embodiments, an error message may include a code that causes a form to include an error icon next to the erroneous data or otherwise draw attention to the erroneous data. Error messages may also consist of or include suggestions for correcting the data. Error messages may be transmitted in real time or within a short time after the receipt of the collected data to facilitate correcting erroneous data while digital pen collection system 202 is still in the proximity of the person providing the data.

Data collection server 204 may also be configured to communicate with computer devices, mobile terminals and other devices that may be used by users. A customer computer device 248 may use an administrative portal available on a website to view status or other information stored at data collection server. Customer computer device 248 may also be used to correct errors identified by data collection server 204. In one embodiment, customer computer device 248 may be configured to transmit status inquiry messages, such as status inquiry message 220, to data collection server 204 via the Internet 222 and to receive status messages 224. The same types of information may be exchanged between a mobile terminal 226 and data collection server 204 via a telephone network 228.

In one implementation, digital pen collection system 202 is used by sales force agents and/or package delivery companies. When delivering a package, a form printed on digital paper and a digital pen may be used to collect data relevant to the delivery of the package. The completed form may then be digitally transmitted to data collection server 204.

Data collected at digital pen collection system 202 may be transmitted to data collection server 204 and validated with rules engine 216. Performing the validation at one or more central locations reduces the processing capability requirements of devices carried by delivery persons. Forms may also be updated somewhat frequently, which may result in new data validation procedures. Performing the validation at one or more central locations facilitates efficient updates to data validation procedures.

Any resulting error messages may then be transmitted to digital pen collection system 202 so that the erroneous data can be corrected while digital pen collection system 202 is still in the proximity of the customer. The customer or a person associated with the customer may use computer device 218 to track the status of the package delivery and/or correct any data errors.

Figure 3:
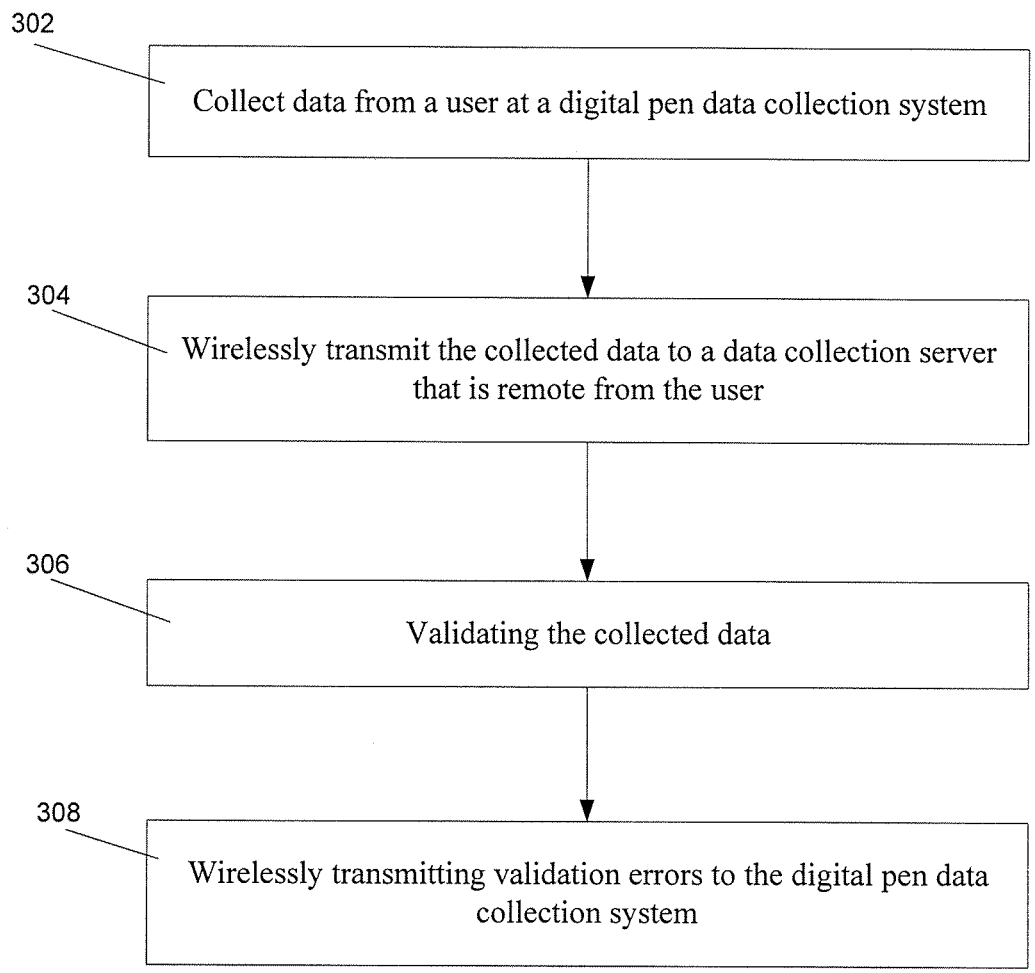
FIG. 3 shows a method of collecting and validating data, in accordance with an embodiment of the invention.

FIG. 3 shows a method of collecting and validating data, in accordance with an embodiment of the invention. First, in step 302, data is collected data from a user at a digital pen data collection system. The user may be a sales force agent, a field force agent, a mailman, or any other person providing data from the field. The digital pen data collection system may be implemented with one or more of the devices described above. Next, in step 304, the collected data is wirelessly transmitted to a data collection server that is remote from the user. As described above, a transmission is considered wireless when the data leaving the digital pen data collection system is in a wireless form and may travel to the data collection server via one or more wired links. The collected data is validated in step 306. The validation may be performed by a rules engine installed at or linked to the data collection server. The rules engine may be implemented with conventional devices that use sets of rules to analyze data. Finally, in step 308 validation errors are wirelessly transmitted to the digital pen data collection system. Of course, updated data may be sent to the data collection server and revalidated.

Embodiments of the invention have been described above with respect implementations involving the delivery of packages. One skilled in the art will appreciate that aspects of the invention may be applied to other implementations that involve the collection of data at a variety of locations remote from an office or central location. For example, other implementations may be used by traveling salesmen, claims adjustors, policeman and investigators.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. For example, aspects of the invention may include input devices other than electronic ink capture devices. All are considered within the sphere, spirit, and scope of the invention.

We claim:

1. A computer-implemented method of collecting data, said method comprising:

receiving a first electronic form associated with a first validation procedure and subsequently receiving a second electronic form associated with a second validation procedure in a forms database of a data collection server, said second electronic form comprising an updated version of said first electronic form;

wirelessly transmitting a first request for said first electronic form from a data collection system at a first location to said data collection server, said data collection server being remote from said data collection system;

receiving said first electronic form at said data collection system from said forms database of said data collection server;

collecting first data entered by a user into said first electronic form at said data collection system while said user is at said first location, wherein said data collection system includes a digital pen and an electronic capture device, wherein said first data comprises a first electronic signature and is entered, using said pen, into said first electronic form displayed on said electronic capture device;

while said user remains proximate to said first location, wirelessly transmitting said first data to said data collection server, wherein said data collection server is operable to validate said first data according to said first validation procedure associated with said first electronic form in real time while said user remains proximate to said first location;

wirelessly receiving second data, in real time while said user remains proximate to said first location, from said data collection server at said data collection system and in response to said data collection server receiving said first data, wherein said second data is associated with at least one error in said first data, wherein said at least one error comprises a violation of an age requirement associated with said first electronic signature, and wherein said second data comprises textual information describing said at least one error, a code that causes said first electronic form to include an icon next to said first electronic signature to identify said at least one error, and a suggestion to collect a second electronic signature for correcting said at least one error;

transmitting, from said data collection server, a status of a task to be fulfilled at said first location in association with said first data entered into said first electronic form to a computing device at a second location remote from said first location;

receiving, at said data collection server, third data entered by a customer at said computing device at said second location, wherein said third data is related to said at least one error in said first data;

updating, with said electronic capture device and said pen, while said user remains proximate to said first location, said first data entered into said first electronic form, thereby generating updated first data that includes said second electronic signature for correcting said at least one error;

wirelessly transmitting said updated first data to said data collection server for validation of said updated first data at said data collection server according to said first validation procedure and based at least in part on said third data; and based on a validation of said updated first data at said data collection server:
fulfilling said task at said first location, and
wirelessly transmitting a second request for said second electronic form from said data collection system to said data collection server such that, following fulfillment of said task at said first location, said second electronic form can be displayed on said electronic capture device, data can be entered into said second electronic form, and said data can be validated according to said second validation procedure at said data collection server.

2. The method of claim 1, wherein said age requirement comprises a minimum age requirement.

3. The method of claim 1, wherein said data collection system includes a mobile terminal, wherein said pen is operable to capture said first data, and wherein said wirelessly transmitting further comprises wirelessly transmitting said first data to said data collection server via said mobile terminal.

4. The method of claim 3, wherein said mobile terminal comprises an application configured to route said first data from said pen to said data collection server.

5. The method of claim 3, wherein said wirelessly receiving further comprises wirelessly receiving said at least one error via said mobile terminal.

6. The method of claim 3, wherein said pen and said mobile terminal are configured to communicate using a short-range radio connection.

7. The method of claim 1, wherein said wirelessly transmitting further comprises communicating said first data as a short message service (SMS) message.

8. The method of claim 1, wherein said wirelessly receiving further comprises communicating said second data as a short message service (SMS) message.

9. The method of claim 1, wherein said first data is selected from a group consisting of package delivery data and sales contract data.

10. The method of claim 1, wherein said validating further comprises comparing said first data to a rules set.

11. The method of claim 10, wherein said rules set comprises rules associated with one or more of a signature requirement, a delivery location, and a type of delivery.

12. The method of claim 1, wherein said first and second electronic forms are operable to be rendered on a display device of said data collection system.

13. The method of claim 12, wherein said first and second electronic forms are received wirelessly at said data collection system.

14. A data collection system comprising:
an electronic capture device operable to collect first data entered by a user into a first electronic form while said user is at a first location, wherein said electronic capture device includes a digital pen, wherein said first data comprises a first electronic signature and is entered, using said pen, into said first electronic form displayed on said electronic capture device;

a mobile terminal operable to request, prior to said first data being entered into said first electronic form, said first electronic form from a data collection server that is remote from said data collection system while said user is at said first location, said data collection server having received said first electronic form in a forms database and subsequently having received a second electronic form comprising an updated version of said first electronic form in said forms database said first electronic form being associated with a first validation procedure and said second electronic form being associated with a second validation procedure, wherein said mobile terminal is further operable to receive said first electronic form from said forms database of said data collection server, wherein said mobile terminal further is operable to access and transmit said first data in real time while the user is at said first location to said data collection server, and wherein said mobile terminal is further operable to receive, in real time while said user remains proximate to said first location, second data from said data collection server in response to said data collection server receiving said first data, wherein said second data is associated with at least one error in said first data, wherein said at least one error comprises a violation of an age requirement associated with said first electronic signature, and wherein said second data comprises textual information describing said at least one error, a code that causes said first electronic form to include an icon next to said first electronic signature to identify said at least one error, and a suggestion to collect a second electronic signature for correcting said at least one error; and a computing device at a second location remote from said first location, said computing device operable to receive, from said data collection server, a status of a task to be fulfilled at said first location in association with said first data entered into said first electronic form, said computing device further operable to collect and transmit third data entered by a customer to said data collection server, wherein said third data is related to said at least one error in said first data;

wherein in response to receiving said second data, said electronic capture device is further operable to collect updated first data that includes said second electronic signature entered into said first electronic form with said capture device and said pen while said user remains proximate to said first location for correcting said at least one error, and wherein said mobile terminal is further operable to access and transmit said updated first data to said data collection server for validation of said updated first data at said data collection server according to said first validation procedure and based at least in part on said third data, such that based on a validation of said updated first data at said data collection server:

said task can be fulfilled at said first location, and said mobile terminal can wirelessly request said second electronic form from said data collection server such that, following fulfillment of said task at said first location, said second electronic form can be displayed on said electronic capture device, data can be entered into said second electronic form, and said data can be validated according to said second validation procedure at said data collection server.

15. The data collection system of claim 14, wherein said age requirement comprises a minimum age requirement.

16. The data collection system of claim 14, wherein said pen is operable to capture said first data, and wherein said mobile terminal is further configured to route said first data from said pen to said data collection server.

17. The data collection system of claim 14, wherein said wirelessly receiving further comprises wirelessly receiving said second data via said mobile terminal.

18. The data collection system of claim 14, wherein said capture device and said mobile terminal are configured to communicate using a short-range radio connection.

19. The data collection system of claim 14, wherein said first data is communicated as a short message service (SMS) message.

20. The data collection system of claim 14, wherein said second data is communicated as a short message service (SMS) message.

21. The data collection system of claim 14, wherein said first data is selected from a group consisting of package delivery data and sales contract data.

22. The data collection system of claim 14, wherein said mobile terminal comprises a display device, and wherein said mobile terminal is further operable to render said first and second electronic forms using said display device.

23. The data collection system of claim 14, wherein said mobile terminal is further operable to wirelessly receive said first electronic form prior to collecting said first data.

24. A data collection server comprising:
    a component operable to
        receive a first electronic form associated with a first validation procedure and subsequently receive a second electronic form associated with a second validation procedure in a forms database of said component, said second electronic form comprising an updated version of said first electronic form,
        wirelessly transmit said first electronic form to a data collection system remote from said component, wherein said data collection system is operable to, while said user is at a first location, collect first data entered by a user into said first electronic form and transmit said first data to said component in real time, wherein said data collection system includes a digital pen and an electronic capture device, wherein said first data comprises a first electronic signature and is entered, using said pen, into said first electronic form displayed on said capture device,
        receive said first data from said data collection system;
    a memory operable to store at least one rule; and
    a rules engine operable to validate said first data using said at least one rule according to said first validation procedure in real time while said user remains proximate to said first location, and wherein said component is further operable to wirelessly transmit second data associated with at least one error in said first data to said data collection system in real time in response to said component receiving said first data while said user remains proximate to said first location, wherein said at least one error comprises a violation of an age requirement associated with said first electronic signature, and wherein said second data comprises textual information describing said at least one error, a code that causes said first electronic form to include an icon next to said first electronic signature to identify said at least one error, and a suggestion to collect a second electronic signature for correcting said at least one error, wherein said component is further operable to transmit a status of a task to be fulfilled at said first location in association with said first data entered into said first electronic form to a computing device at a second location remote from said first location, wherein said component is further operable to receive third data entered by a customer at said computing device at said second location, wherein said third data is related to said at least one error in said first data, wherein, in response to receiving said second data, said first data entered into said first electronic form is updated, with said electronic capture device and said pen and while said user remains proximate to said first location, thereby generating updated first data that includes said second electronic signature for correcting said at least one error, and wherein said component is further operable to receive and validate said updated first data according to said first validation procedure and based at least in part on said third data, such that:

said task can be fulfilled at said first location, and said component can receive a request for a second electronic form from said data collection system and wirelessly transmit said second electronic form to said data collection system, such that, following fulfillment of said task at said first location, said second electronic form can be displayed on said electronic capture device, data can be entered into said second electronic form, and said data can be validated according to said second validation procedure at said component.

25. The data collection server of claim 24, wherein said age requirement comprises a minimum age requirement.

26. The data collection server of claim 24, wherein said component is further operable to receive said first data from a mobile terminal of said data collection system.

27. The data collection server of claim 24, wherein said component is further operable to transmit said second data to a mobile terminal of said data collection system.

28. The data collection server of claim 24, wherein said first data is communicated as a short message service (SMS) message.

29. The data collection server of claim 24, wherein said at least one error is communicated as a short message service (SMS) message.

30. The data collection server of claim 24, wherein said first data is selected from a group consisting of package delivery data and sales contract data.

31. The data collection server of claim 24, wherein said rules engine is further operable to validate said first data by comparing said first data to said at least one rule.

32. The data collection server of claim 24, wherein said at least one rule is associated with one or more of a signature requirement, a delivery location, and a type of delivery.

33. The data collection server of claim 24, wherein said memory is further operable to store said first and second electronic forms in said forms database.

34. The data collection server of claim 24, wherein said first and second electronic forms are operable to be rendered on a display device of said data collection system.

* * * * *